United States Patent [19]
Firooz et al.

[11] Patent Number: 6,145,019
[45] Date of Patent: Nov. 7, 2000

[54] UNCONFIGURED DEVICE THAT AUTOMATICALLY CONFIGURES ITSELF AS THE PRIMARY DEVICE IF NO OTHER UNCONFIGURED DEVICE IS PRESENT

[75] Inventors: Jonathan Firooz, Loveland; J. Robert Sims, III, Fort Collins, both of Colo.

[73] Assignee: Hewlett-Packard Company, Palo Alto, Calif.

[21] Appl. No.: 09/033,234

[22] Filed: Mar. 2, 1998

[51] Int. Cl.[7] .................................................. G06F 3/00
[52] U.S. Cl. ........................ 710/8; 710/8-10; 710/15; 710/36; 379/177
[58] Field of Search ................. 710/8, 15, 36; 379/177; 360/73.02

[56] References Cited

U.S. PATENT DOCUMENTS

| | | | |
|---|---|---|---|
| 4,360,870 | 11/1982 | McVey | 364/200 |
| 4,373,181 | 2/1983 | Chisholm et al. | 364/200 |
| 4,775,930 | 10/1988 | Clawson et al. | 364/200 |
| 4,837,680 | 6/1989 | Crockett et al. | 364/200 |
| 4,907,105 | 3/1990 | Kurzweil, Jr. | 360/73.02 |
| 5,014,193 | 5/1991 | Garner et al. | 364/200 |
| 5,247,682 | 9/1993 | Kondou et al. | 395/700 |
| 5,313,595 | 5/1994 | Lewis et al. | 395/325 |
| 5,428,748 | 6/1995 | Davidson et al. | 395/275 |
| 5,519,882 | 5/1996 | Asano et al. | 710/10 |
| 5,553,245 | 9/1996 | Su et al. | 395/284 |
| 5,649,233 | 7/1997 | Chen | 395/800 |
| 5,689,726 | 11/1997 | Lin | 710/10 |
| 5,745,557 | 4/1998 | Anglikowski | 379/177 |
| 5,848,294 | 12/1998 | Clark | 710/36 |
| 5,852,743 | 12/1998 | Yeh | 395/838 |
| 5,862,375 | 1/1999 | Gephardt | 395/651 |
| 5,867,730 | 2/1999 | Leyda | 710/10 |
| 5,964,871 | 10/1999 | Hester et al. | 713/1 |

FOREIGN PATENT DOCUMENTS

| | | | |
|---|---|---|---|
| 0629098 A2 | 12/1994 | European Pat. Off. | |
| 0778532A2 | 6/1997 | European Pat. Off. | G06F 13/40 |
| 07160378 | 6/1995 | Japan | G06F 3/00 |

OTHER PUBLICATIONS

"Plug And Play: Une Philosophie De Conception Des PC", Electronique No. 37; Avril 1994; pp. 36–39.

*Primary Examiner*—Thomas C. Lee
*Assistant Examiner*—Tammara Peyton
*Attorney, Agent, or Firm*—Augustus W. Winfield

[57] ABSTRACT

A method of automatically configuring a computer peripheral device as a primary device or as a secondary device. There are four possible cases: (1) no other device present, (2) legacy primary device present, (3) legacy secondary device present and (4) second unconfigured device present. Each unconfigured device determines whether there are any legacy devices already installed and whether there is another unconfigured device installed without requiring any changes to the host operating system software. Unconfigured devices assert a signal after reset with a first timing that is dependent on an electronically readable identification on the device. For case (4), the first device to detect the signal becomes the secondary device. In case of a tie, unconfigured devices continue to assert the signal with a second timing that is dependent on the electronically readable identification on the device. A device that detects the signal being present at the end of the second timing configures itself as a secondary device. A device that does not detect the signal being present at the end of the second timing configures itself as a primary device.

3 Claims, 2 Drawing Sheets

UNCONFIGURED DEVICE THAT AUTOMATICALLY CONFIGURES ITSELF AS THE PRIMARY DEVICE IF NO OTHER UNCONFIGURED DEVICE IS PRESENT

FIELD OF INVENTION

This invention relates generally to computer peripheral devices and more specifically to automatic configuration of primary and secondary devices for personal computers.

BACKGROUND OF THE INVENTION

For personal computers using Intel compatible microprocessors, peripheral devices (for example, magnetic disk drives, compact disc drives, tape drives, and some devices other than mass memory devices) commonly use an industry specified bus interface called AT Attachment (ATA). The computer systems support at least two ATA host adapters (which may be combined on a single printed circuit board), each of which can support up to two peripheral devices. For each host adapter, there may be one primary device (or "master" or device 0) and one secondary device (or "slave" or device 1). In addition, device electronics for a primary device need to be aware of whether there is a secondary device present. Typically, a set of small removable 2-pin connectors (called jumpers) on each device determine, among other things, whether the device is a primary or secondary device, and if primary whether there is a secondary device present. Jumper configurations are not standard, they are typically poorly labeled, and they are typically difficult to access without removing a device. Confusion over jumper requirements has led to a great deal of customer frustration and numerous phone calls to customer service organizations.

Personal computer peripheral devices commonly integrate most of the input/output (I/O) electronics along with the device electronics, using industry specifications called Integrated Drive Electronics (IDE). IDE devices may be designed for many different host computer bus systems, including ATA. For Intel compatible personal computers, cabling specifications and signal definitions may be referred to as ATA specifications or IDE specifications, depending on the manufacturer. For Intel compatible personal computers, the most common ATA/IDE mass memory interface cable is a 40-conductor ribbon cable. Connector pin/socket 39 provides a signal called Drive Active/Slave Present (DASP). DASP drivers are implemented as open-collector drivers on the ATA devices. DASP is asserted by driving the line low. DASP is a time multiplexed signal that may be asserted by either device. The signal is used during a power-up/reset initialization phase to indicate that a secondary (slave) device is present, and is used later to indicate device activity. During power-on initialization, if a secondary device is present, the secondary device asserts DASP within 400 milliseconds of power-on. If no secondary device is present, the primary device may assert DASP after a delay of 450 milliseconds after power-on. If a secondary device is present, the secondary device deasserts DASP following the receipt of a valid command or after the secondary device is ready, or after 31 seconds, whichever comes first. Once DASP is deasserted, either device can assert DASP to light a device-activity light emitting diode (LED). If a secondary device is not present, the primary device is then automatically further configured as a primary device with no secondary device present and the primary device then responds to commands sent to a secondary device. If a secondary device asserts DASP within the proper time window, the primary device is automatically further configured as a primary device with a secondary device present and the primary device then does not respond to commands sent to the secondary device. There is no general standard for a provision for a host computer to be able to command a primary device to change its configuration. That is, once a primary device configures itself as "with secondary" or "without secondary" there is no general standard way to override that autoconfiguration.

For ATA/IDE peripheral devices, read and write commands from the host computer are written directly to registers in the peripheral devices. Two commands of interest to the present patent document are Chip-Select-0 (CS0, also known in the industry as CS1FX) and Chip-Select-1 (CS1, also known in the industry as CS3FX) which are asserted by the host to specify a target register in a peripheral device. Typically, about 5 seconds after a system reset, the computer Basic-Input-Output-System (BIOS) asserts CS0 or CS1 as part of an enquiry to see which ATA/IDE devices might be present. A configured device responds by asserting an interrupt signal (INTRQ).

One industry effort to eliminate the need for configuration jumpers for determination of primary/secondary device status is included in an industry specification called Plug and Play ATA. In Plug and Play ATA, primary/secondary device status is determined by which one of two cable connectors is attached to a device. Plug and Play ATA dedicates one wire of a standard interface cable to a signal called Cable Select. The Cable Select line is grounded by the host computer. In the interface cable, the Cable Select line connects to its corresponding socket in the connector for a primary device, and does not connect to its corresponding socket in the connector for a secondary device. If a device connected to the interface cable detects that the Cable Select line is grounded, the device configures itself to be a primary device, and if the device does not detect a ground potential on the Cable Select line the device configures itself to be a secondary device.

Automatic address determination is also a problem for the I/O boards on the I/O bus of the host computer. For Intel compatible computers, one industry specification for automatically configuring I/O boards for the ISA bus is called the Plug and Play ISA Standards. For ISA Plug and Play, each compatible I/O card has a unique identifier that includes a vendor identifier and a serial number. Each compatible I/O card can read its own identifier. The host computer first places all the cards into a configuration mode. Then the host computer drives a line with a series of transitions indicating sequential bit positions within each identifier. At the end of each series, at most only one I/O card remains active. The sequence of bits from the host computer logically progresses from least-significant-bit to most-significant-bit for the identifiers. At each bit position in the sequence, each compatible I/O card determines whether its identifier has a logical one in the same bit position. If the I/O card identifier has a logical one in the same position, the I/O card drives the bus to a particular value. If at any bit position in the sequence an I/O card identifier has a logical zero at the bit position, the I/O card does not drive the bus, and determines whether any other card is driving the bus to the particular value. If at any bit position in the sequence an I/O card identifier has a logical zero at the bit position and another card is driving the bus to the particular value, the I/O card having a logical zero at the bit position ceases to participate in the remainder of the sequence. At the end of all the bit positions for an identifier, one card remains. This card is assigned a logical device number by the host. The sequence is then repeated to isolate another card and so forth until all cards have been assigned a logical device number.

Another common interface standard for ATA devices is the Small Computer System Interface (SCSI). SCSI also requires a unique ID for each device. An industry group has proposed a set of specifications, called Plug and Play SCSI, which among other things provides automatic assignment of unique SCSI IDs. The particular protocol for assignment of unique IDs is called SCSI Configured AutoMagically (SCAM). Each SCAM compatible device has a default ID saved in a non-volatile device memory. A SCAM master device first commands each of the other SCAM devices, one at a time, to go into an inactive state. Then, the master device uses a protocol similar to the protocol for ISA Plug and Play to isolate each device for assignment of a SCSI address.

Plug and Play ATA substantially improves ease of use when it is implemented for new systems. However, many new devices need to be installed into systems that predate the Plug and Play ATA specifications. In addition, Plug and Play ATA is not a universally adopted standard, so that devices installed into some new systems still may require jumper configuration.

There is a need for further improvement for automatic determination of primary/secondary device status when a new device is installed, particularly for devices being installed into older or non-standard systems.

SUMMARY OF THE INVENTION

A newly installed unconfigured device in accordance with the invention performs a series of waits, monitoring various activity during each wait period. First, the unconfigured device waits after reset to see if a legacy secondary device asserts DASP. If no secondary device asserts DASP, the unconfigured device waits a second time period for the host computer to assert either CS0 or CS1. Once one of these signals is asserted, the unconfigured device enters a third wait period and monitors an interrupt line. If interrupts are detected, a primary device must be present. If no interrupts are detected, there are no legacy devices present, but there may be another unconfigured device present. The unconfigured device then waits during a fourth wait period that is dependent on a device identification number, monitoring the DASP line during the fourth wait time. If a DASP signal is detected during the fourth wait period, the unconfigured device configures itself as a secondary device. If no DASP signal was detected during the fourth wait period, the unconfigured device then asserts DASP and enters a fifth wait period. The fifth wait period is also dependent on the identification number, and is different than the fourth wait period. At the end of the fifth wait period, the unconfigured device deasserts DASP and immediately checks to see if some other device is asserting DASP. If another device is asserting DASP, the unconfigured device configures itself as a secondary device. If no other device is asserting DASP after the fifth wait period, the unconfigured device configures itself as a primary device.

If the fourth wait period can be guaranteed to be unique for every identification number, there is no need for the fifth wait period. However, one simple way of implementing a wait period as a function of an identification number is to perform a modulo operation. It is possible that two modulo operations using two different identification numbers might result in identical results. By implementing the fifth wait period, with different integers for the various modulo operations, the probability of two pairs of identical wait periods for two different identification numbers becomes very small.

DETAILED DESCRIPTION OF THE PREFERRED EMBODIMENT OF THE INVENTION

Figure 1A:
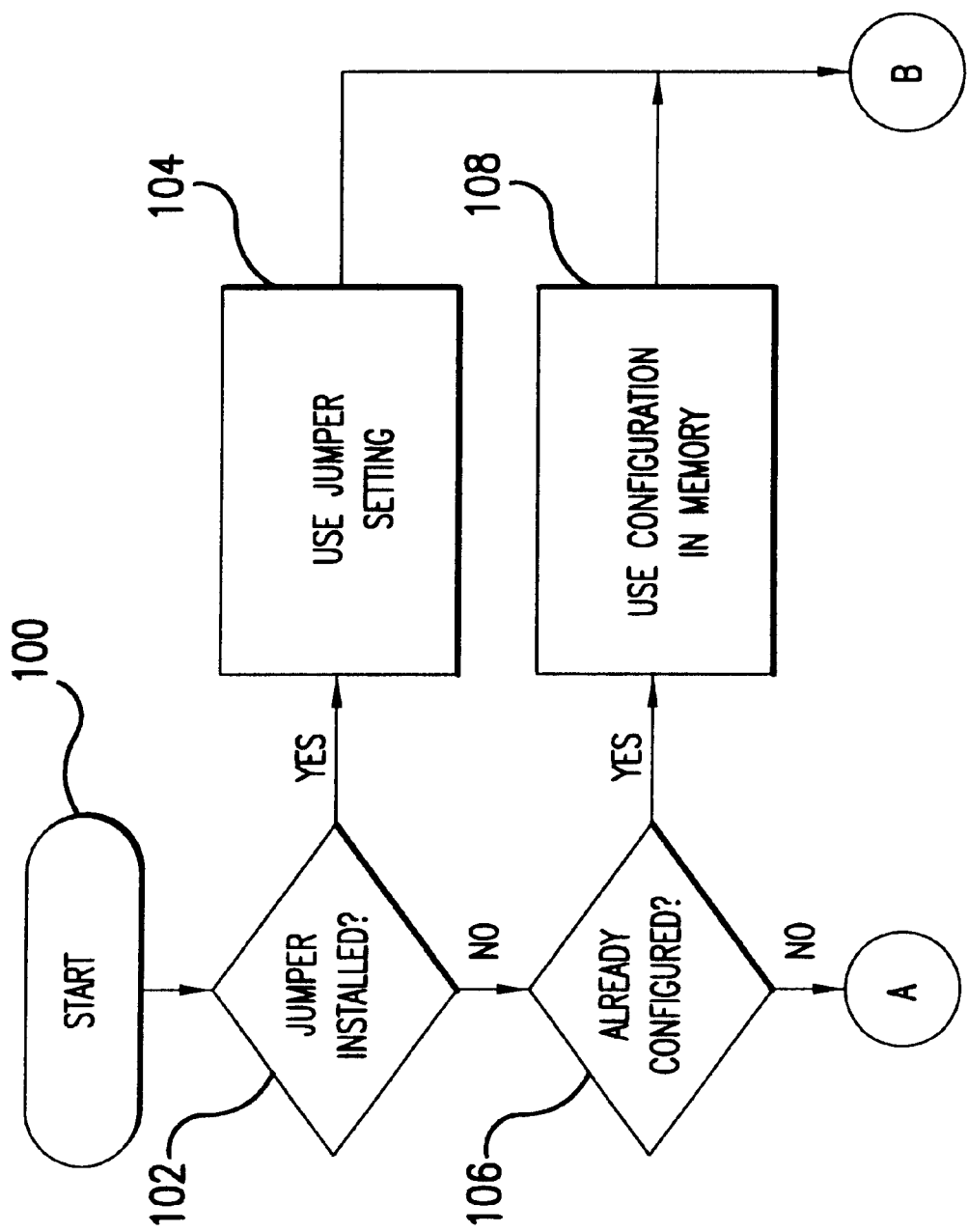
FIG. 1A is a flow chart of part of an example embodiment of a method in accordance with the invention.

In the following example embodiment of the invention, a device referred to as an unconfigured device means a device having specifications in accordance with the invention. A device having specifications in accordance with the invention is initially unconfigured, neither a primary device or a secondary device. A device that is already configured or a device that does not conform to the specifications in accordance with the invention is referred to as a legacy device. Note that a device conforming to Plug and Play ATA may be initially "unconfigured" but if it does not also conform to the specifications of the invention it is considered to be a legacy device for purposes of the invention. In the example embodiment, an unconfigured device is being added to an ATA/IDE system. There may or may not be another device already present. There are four possible cases as follows: (1) no other device present, (2) legacy primary device present, (3) legacy secondary device present and (4) another unconfigured device present (another unconfigured device that also conforms to the specifications in accordance with the invention).

The present invention is primarily concerned with electronic device identification at the peripheral device hardware level and host software driver level. Independent of hardware identification and driver identification, host operating system software may have a separate identification for peripheral devices. For example, for mass memory devices, the host operating system may refer to the devices as Drive C or Drive D and so forth.

For unconfigured devices in accordance with the invention, there are two alternatives for action after installation. In one alternative, once an unconfigured device is configured, the device retains its configuration in a non-volatile memory. A configured device is then effectively a legacy device. Note that the first alternative is consistent with the configuration philosophy of Plug and Play ATA, in which the customer is expected to explicitly take action to change configuration. In a second alternative, all devices reconfigure every time there is a power-on/reset event.

In the following example embodiment, unconfigured devices have a unique identification number in an electronic form readable by the device controller electronics. The identification number may, for example, comprise an assigned unique manufacturer number plus a factory determined serial number for the device. In the second alternative (configuration not saved), even though devices reconfigure every time there is a power-on/reset event, they will always configure the same way. Therefore, for any particular pair of devices, the configuration will stay constant until a device is removed or added. Note that the second alternative is consistent with the configuration philosophy of Plug and Play SCSI, in which device configuration is completely automatic, and may automatically change when a device is deleted or added.

Because of a lack of rigid industry standards, automatic configuration as taught in the present patent document may not work for all systems. Therefore, unconfigured devices in accordance with the invention may still have provision for optional jumpers to ensure that configuration is possible in all systems. Preferably, if configuration jumpers are present, the jumpers determine the configuration. Specifically, at power-on/reset, an unconfigured device should check its jumper block. If a jumper is set, the device should clear any configuration information in non-volatile memory (if present) and proceed with the initialization process according to the jumper setting. Likewise, as discussed above, if no jumpers are present, and a configuration exists in non-volatile memory, the device should proceed with the initialization in accordance with the configuration previously set in non-volatile memory. If no jumpers are present and no configuration exists in nonvolatile memory, then the unconfigured device should follow the autoconfiguration procedures discussed below in this patent document.

Figure 1B:
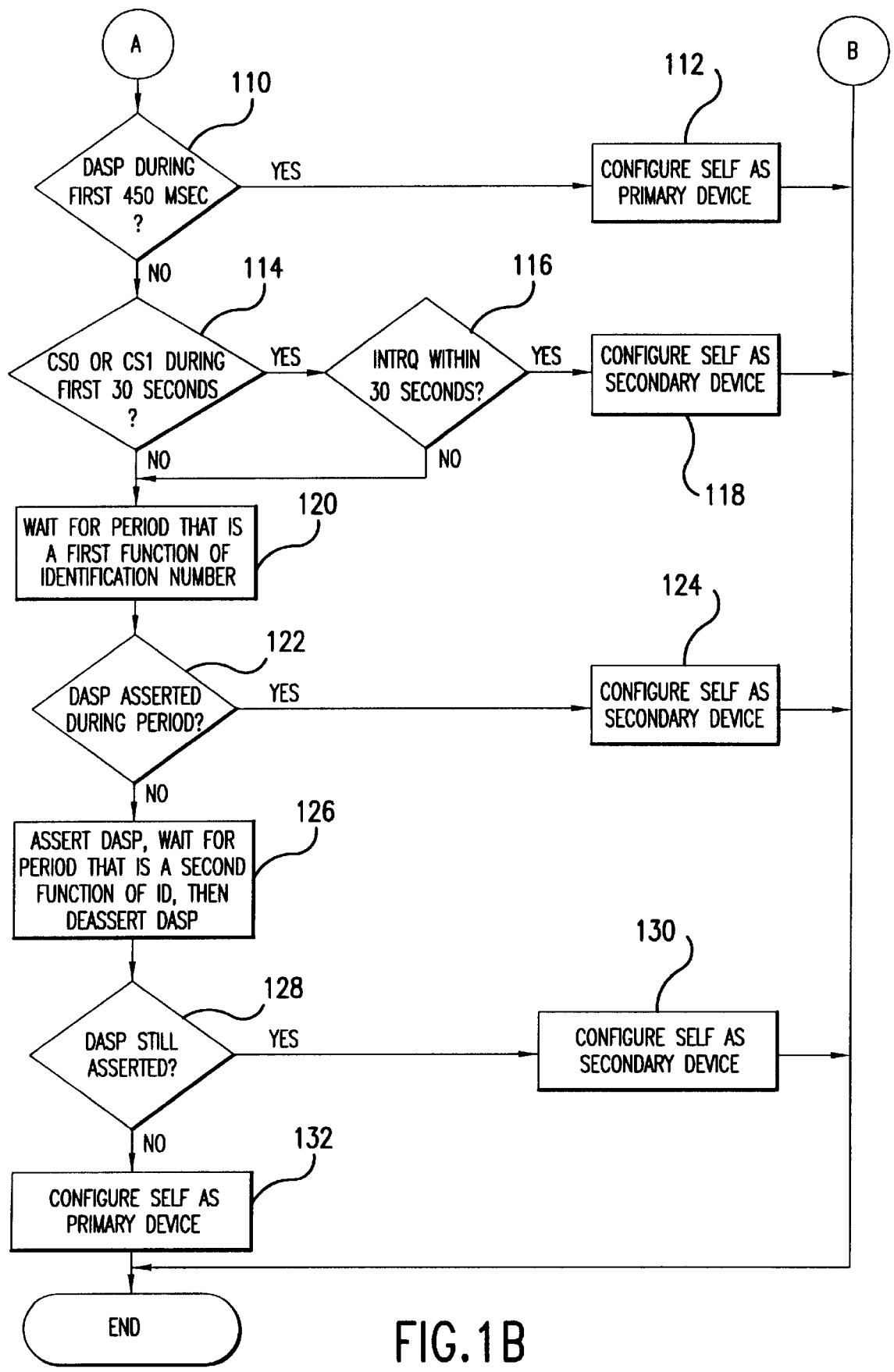
FIG. 1B is a flow chart continuation of FIG. 1A.

FIGS. 1A and 1B illustrate an example embodiment of the invention. At step 100 a system reset starts the process of configuration. As discussed above, unconfigured devices may have an alternative provision for configuration jumpers. Accordingly, if jumpers are installed (test 102), the jumpered configuration is used (step 104), any configuration information in non-volatile memory is erased, and the automatic configuration process is bypassed. In addition, as discussed above, once a device has been automatically configured, the configuration may be stored in nonvolatile memory in the device. Therefore, if the device is already configured and the configuration is stored (test 106), the stored configuration is used (step 108).

In FIG. 1B, an unconfigured device first waits to see if a configured secondary device asserts DASP (decision 110). For present standards, the first monitoring period for decision 110 needs to be greater than 400 msec and less than 450 msec. If a device asserts DASP during the first wait period, the unconfigured device configures itself as a primary device (step 112). If no device asserts DASP during the first wait period, the unconfigured device then monitors control lines for host assertion of CS0 or CS1 (decision 114). A host computer may assert these signals even though there are no configured devices installed. If CS0 or CS1 are sent, the unconfigured device waits an additional 30 seconds to see if a device asserts INTRQ in response (decision 116). If INTRQ is asserted, there must be another device and the other device must be a primary device (DASP was not asserted during the first 400 msec) and the unconfigured device configures itself as a secondary device (step 118).

If DASP has not been asserted within 450 msec and INTRQ is not asserted within 30 seconds of a host command, there are no configured devices present and the unconfigured device proceeds to step 120 to determine whether there is another unconfigured device present. At step 120, an unconfigured device monitors DASP for a period determined by a first function of a device readable identification number. An example function is to wait a number of milliseconds equal to the identification number modulo an integer. If another unconfigured device is present, the other unconfigured device is also waiting a time period that is a function of its identification number. For example, the second device may be waiting a number of milliseconds equal to its identification number modulo the same integer as the first unconfigured device. At the end of the wait period, each unconfigured device asserts DASP (step 126). If, during the wait period, DASP is detected (decision 122), another unconfigured device is present and the device detecting DASP configures itself as a secondary device (step 124).

If there are two unconfigured devices present, and both implement a wait period as discussed above, and both devices use the same integer for a modulo operation for the wait period of step 120, it is possible that both modulo operations compute to the same result. Therefore, at the end of the wait period of step 120, it is possible for two unconfigured devices to simultaneously assert DASP at step 126. Therefore, a second wait is performed (step 126) with a different timing function based on the identification number (for example, a modulo operation with a different integer), and then DASP is deasserted. Each unconfigured device then checks to see if some other device is asserting DASP (decision 128). If another device is asserting DASP, then the detecting unconfigured device configures itself as a secondary device (step 130). If no other device is asserting DASP at the end of the second timing function based on identification number, an unconfigured device configures itself as a primary device (step 132).

Consider FIGS. 1A and 1B in light of the four possible cases:

(1) No other device present. An unconfigured device will have no jumpers (decision 102), no stored configuration (decision 106), will not see DASP in the first 450 msec (decision 110), will not see INTRQ (decision 116), and will not see DASP after the two ID dependent wait periods (decisions 122 and 128), and the unconfigured device will therefore configure itself as a primary device (step 132).

(2) Legacy primary device present. A legacy primary will respond to CS0 or CS1 (decision 114) with an interrupt (decision 116) and the unconfigured device will therefore configure itself as a secondary device (step 118).

(3) Legacy secondary device present. A legacy secondary will assert DASP during the first 450 msec (decision 110) and the unconfigured device will therefore configure itself as a primary device (step 112).

(4) Another unconfigured device present. Each unconfigured device will reach step 120 and wait a first period related to identification number. If the first ID dependent wait periods for the two devices are not identical, one of the two devices will detect DASP during its ID dependent wait and will configure itself as a secondary device (124). The other device will then never detect DASP and will perform step 126 and decision 128, and then configure itself as a primary device (step 132). If the first ID dependent wait periods are identical, then at the end of the second ID dependent wait period, one device will detect that DASP is still asserted (decision 128) and configure itself as a secondary device (step 130). The other device will not detect DASP at decision 128, and will configure itself as a primary device (step 132).

Note that autoconfiguring devices may need to change configuration later. As mentioned above, if configuration is not saved in non-volatile memory, configuration is redetermined at every system reset. If configuration is saved in non-volatile memory, there are several options for changing configuration. One option is to install a jumper. Recall from the above discussion that if a jumper is installed, the jumper determines configuration and non-volatile memory is erased. A second option is to provide software that addresses a specific configured drive (primary or secondary) with a special reconfigure command. For removable memory drives, insertion of a special medium may be used to trigger a reconfiguration.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of automatically configuring an unconfigured device electrically coupled to an adapter, the adapter electrically coupled to a computer, the method comprising the following steps:

determining, by the unconfigured device, that no configured device is electrically coupled to the adapter;

determining, by the unconfigured device, that no other unconfigured device is electrically coupled to the adapter; and configuring, by the unconfigured device, itself as a primary device.

2. A method of automatically configuring an unconfigured device electrically coupled to an adapter, the adapter electrically coupled to a computer, the method comprising the following steps:

determining, by the unconfigured device, that no configured device is electrically coupled to the adapter;

determining, by the unconfigured device, that another unconfigured device is electrically coupled to the adapter; and configuring, by the unconfigured device, itself as a secondary device.

3. A method of automatically configuring an unconfigured device electrically coupled to an adapter, the adapter electrically coupled to a computer, the method comprising the following steps:

determining, by the unconfigured device, that no configured device is electrically coupled to the adapter;

waiting, by the unconfigured device, for a first time period that is a function of an identification number for the unconfigured device;

configuring, by the unconfigured device, itself as a secondary device when a second device indicates a presence during the first time period;

waiting, by the unconfigured device, for a second time period that is a function of the identification number of the unconfigured device, when no second device indicates a presence during the first time period;

configuring, by the unconfigured device, itself as a secondary device when there is an indication at the end of the second time period of a second device being present; and configuring, by the unconfigured device, itself as a primary device when there is no indication at the end of the second time period of a second device being present.

* * * * *